(12) United States Patent
Hagen et al.

(10) Patent No.: US 6,935,255 B2
(45) Date of Patent: Aug. 30, 2005

(54) AUXILIARY SEED HOPPER HAVING A REMOVABLE SCREEN

(75) Inventors: Matthew Brian Hagen, Bettendorf, IA (US); James Irwin Lodico, Hampton, IL (US)

(73) Assignee: Deere & Company, Moline, IL (US)

( * ) Notice: Subject to any disclaimer, the term of this patent is extended or adjusted under 35 U.S.C. 154(b) by 90 days.

(21) Appl. No.: 10/637,147

(22) Filed: Aug. 8, 2003

(65) Prior Publication Data

US 2005/0028714 A1 Feb. 10, 2005

(51) Int. Cl.⁷ ............................. A01C 7/00; A01C 9/00
(52) U.S. Cl. .................................................. 111/174
(58) Field of Search ..................... 111/170–188, 77, 111/925; 221/211

(56) References Cited

U.S. PATENT DOCUMENTS

| | | | |
|---|---|---|---|
| 5,156,102 A | 10/1992 | Andersen | 111/175 |
| 5,161,473 A | 11/1992 | Landphair et al. | 111/176 |
| 5,392,722 A | 2/1995 | Snipes et al. | 111/174 |
| 5,740,746 A | 4/1998 | Ledermann et al. | 111/174 |
| 5,915,313 A | 6/1999 | Bender et al. | 111/178 |
| 6,047,652 A | 4/2000 | Prairie et al. | 111/174 |
| 6,298,797 B1 | 10/2001 | Mayerle et al. | 111/175 |
| 6,675,728 B2 * | 1/2004 | Lee et al. | 111/63 |

OTHER PUBLICATIONS

Farm Forum Advertisement, "Productive Equipment Systems", p. 25, Spring 2002.

* cited by examiner

Primary Examiner—Christopher J. Novosad

(57) ABSTRACT

A pneumatic seed on demand delivery system comprises a frame having a main hopper and an individual planting unit. An air pump directs pressurized air to a nozzle located at the base of the main hopper. The seed in the main hopper is taken up by the air stream passing through the nozzle and is directed to an auxiliary hopper located on the planting units. The auxiliary hopper has sidewalls that are provided with an opening into which is inserted a removable screen for venting the interior of the auxiliary hopper. An exterior wall extends outward from the auxiliary hopper to protect the removable screen and is open at the bottom to vent air from the removable screen. The removable screen is trapped in the opening by a removable lid engaging the sidewalls of the auxiliary hopper.

15 Claims, 2 Drawing Sheets

US 6,935,255 B2

AUXILIARY SEED HOPPER HAVING A REMOVABLE SCREEN

FIELD OF THE INVENTION

The present invention is directed to a seeding machine having an auxiliary hopper with a removable vent screen located in the sidewall for receiving seed pneumatically from a main hopper.

BACKGROUND OF THE INVENTION

Pneumatic product on demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed.

Air seeders meter seed upstream of the transporting air stream. As the meter is more remote from the application device the product is not metered onto the field in as accurate a manner as an application unit where the product meters are in close proximity to the application site.

The auxiliary seed hoppers on commercially available pneumatic seed on demand delivery systems are provided with vents for venting excess pneumatic pressure from the auxiliary hopper. In at least one commercially available system the vent is located in the sidewall of the auxiliary hopper and is provided with a screen that is fixed thereto. The screen is protected by an exterior wall that extends outward from the auxiliary hopper. The exterior wall is provided with an open bottom through which air can vent. Because of the fixed nature of this screen it is more difficult to clean and replace if damaged.

SUMMARY OF THE INVENTION

It is an object of the present invention to provide an auxiliary hopper for a pneumatic seed on demand delivery system having a removable screen located in the sidewall of the auxiliary hopper.

A pneumatic seed on demand delivery system comprises a frame having a main hopper and an individual planting unit. An air pump directs pressurized air to a manifold where the pressurized air is distributed to a nozzle located at the base of the main hopper. The seed in the main hopper is taken up by the air stream passing through the nozzle and is directed to an auxiliary hopper located on the planting units. The auxiliary hopper has sidewalls that are provided with an opening into which is inserted a removable screen for venting the interior of the auxiliary hopper. An exterior wall extends outward from the auxiliary hopper to protect the removable screen and is open at the bottom to vent air from the removable screen. The removable screen is trapped in the opening by a removable lid engaging the sidewalls of the auxiliary hopper.

DETAILED DESCRIPTION

Figure 1:
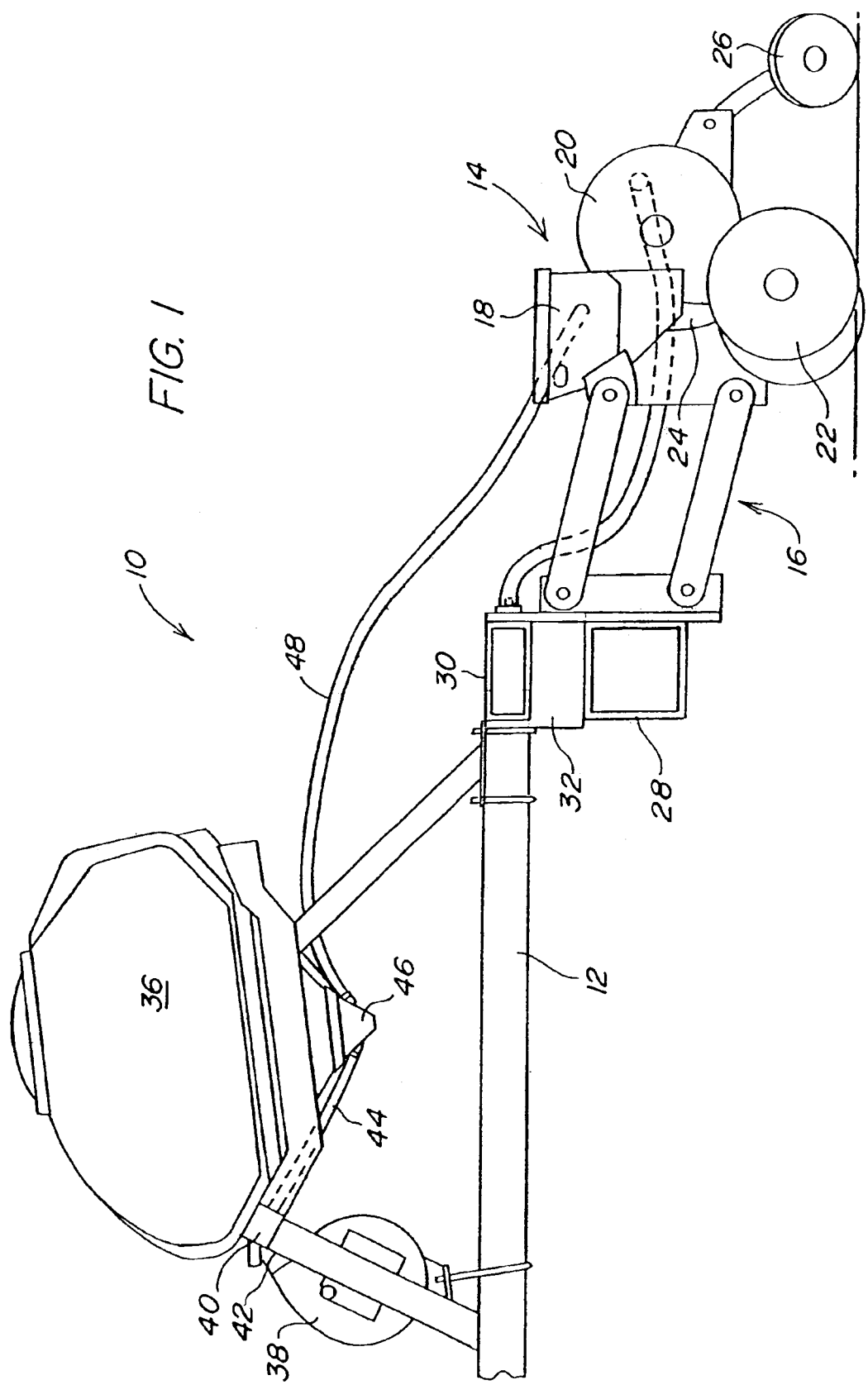
FIG. 1 is a side schematic view of the pneumatic seed delivery system.
Figure 2:
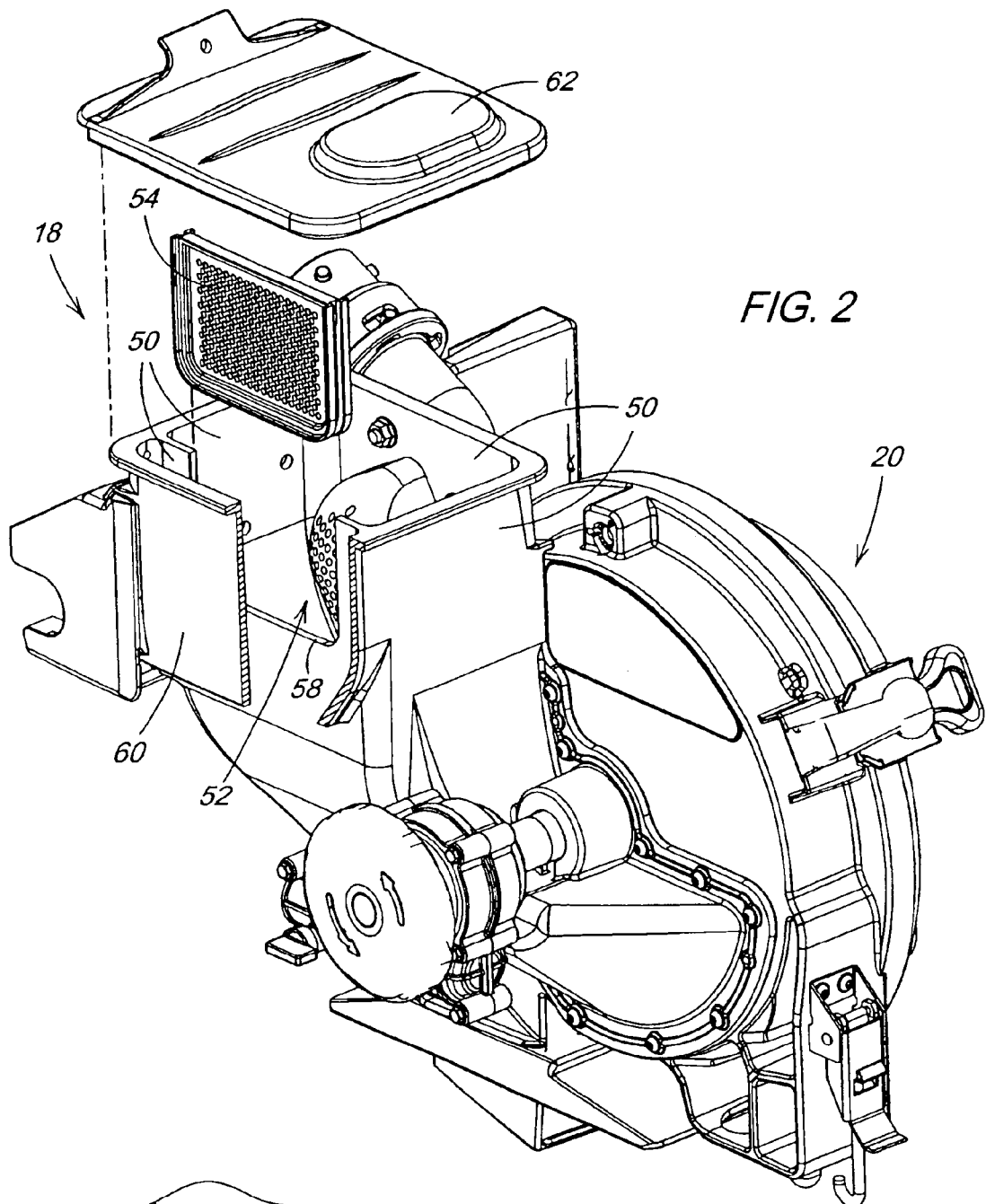
FIG. 2 is an exploded perspective view of an auxiliary hopper and seed meter.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the illustrated embodiment the seed meter 20 is a vacuum seed meter, although positive air pressure could also be used with the subject invention.

The frame 12 is provided with a truss toolbar comprising a main toolbar 28 and a secondary bar 30 that is coupled to the main toolbar by webs 32. The parallelogram linkages 16 of the individual planting units 14 are directly coupled to the main toolbar 28. The secondary toolbar 30 is sealed and functions as a pneumatic manifold for the pneumatic seed meters 20.

Seed is stored in a main hopper 36 mounted on the frame 12. An air pump 38 is used to pneumatically transfer seed from the main seed hopper 36 to the auxiliary seed hopper 18. The air pump 38 is driven by a hydraulic motor, however other motor arrangements could be used, like electric motors for driving the air pump 38. The air pump 38 directs pressurized air to a manifold 40 through a main air hose 42. The manifold 40 is formed from a hollow closed tubular support of the frame 12. The manifold 40 is provided with a plurality of manifold outlets corresponding to the number of planting units 14 mounted to the frame 12. Individual air supply lines 44 extend from the manifold outlets and direct pressurized air from the manifold 40 to the upstream side of the nozzle assembly 46. The nozzle assembly 46 is located at the bottom of the main hopper 36. Product located in the main hopper 36 flows by gravity to the nozzle assembly 46. The upstream side of the nozzle assembly 46 is provided with a number of air inlets corresponding to the number of air supply hoses 44. The air inlets are spaced transversely along the upstream side of the nozzle assembly 46. The downstream side of the nozzle assembly 46 is provided with a number of product outlets corresponding to the number of air supply hoses 44. The product outlets are also spaced transversely along the downstream side of the nozzle assembly 46. The product outlets lie opposite from the air inlets. Each air inlet is aligned with a respective product outlet. Product supply hoses 48 extend from the product outlets to the individual auxiliary hoppers 18 for directing product entrained in the air stream to the auxiliary hoppers 18.

Figure 3:
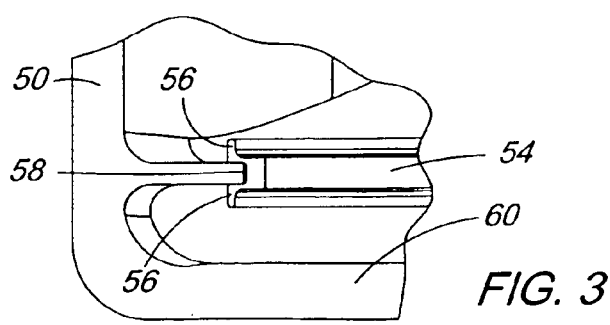
FIG. 3 is a partial top view of the removable screen and opening edge.

To prevent the buildup of pneumatic pressure in the auxiliary hopper 18, it is important to vent air from the auxiliary hopper 18. The auxiliary hopper 18 is provided with sidewalls 50 at least one of the sidewalls is provided with an U-shaped opening 52 that is open towards the top. A removable screen 54 is slidably inserted into the opening 52. The removable screen 54 is provided with holes which allow air to pass, but not seed. As is best illustrated in FIG. 3 the removable screen 54 is provided with channel edges 56 which engage opening edges 58 of the opening 52. The removable screen 54 is protected by an exterior wall 60 that extends outward from the auxiliary hopper 18. The exterior wall 60 is provided with an open bottom through which air can vent. A removable lid 62 closes the auxiliary hopper 18 and the space defined by the exterior wall 60 and the removable screen 54. The removable lid 62 traps the removable screen 54 in the opening 52.

Having described the illustrated embodiment, it will become apparent that various modifications can be made without departing from the scope of the invention as defined in the accompanying claims.

What is claimed is:

1. A seeding machine comprising:

a frame, a main seed hopper mounted to the frame;

a plurality of planting units are independently mounted to the frame, each of the planting units comprises an auxiliary seed hopper, a seed meter for receiving and metering seed from the auxiliary hopper, and a furrow opener for forming a planting furrow into which seed is deposited from the seed meter;

a source of pneumatic pressure directs seed from the main seed hopper to the auxiliary hoppers through flexible hoses; and the auxiliary hopper is provided with sidewalls defining an interior for receiving seed, the sidewalls are provided with an opening having a removable screen through which air can be vented;

wherein the auxiliary hopper has an open top that is enclosed by a removable lid.

2. A seeding machine as defined by claim 1 wherein the opening is defined by opening edges in the sidewalls, the opening being upwardly open towards the removable lid.

3. A seeding machine as defined by claim 2 wherein the removable screen has channel edges that engage the opening edges of the sidewalls.

4. A seeding machine as defined by claim 3 wherein the removable screen is trapped in the opening by the removable lid engaging the auxiliary hopper.

5. A seeding machine as defined by claim 4 wherein the removable screen is protected by an exterior wall that extends outward from the auxiliary hopper, the exterior wall defining an open bottom.

6. An auxiliary hopper for a planting units of a seeding machine, the auxiliary hopper comprising:

sidewalls defining an interior for receiving seed, the sidewalls are provided with an opening;

an outlet seed passage extending from the interior to a seed meter;

a removable screen is removably mounted in the opening through which air can be vented;

wherein the auxiliary hopper is provided with a inlet seed passage through which seed gasses into the interior; and wherein the auxiliary hopper has an open top that is enclosed by a removable lid.

7. An auxiliary hopper as defined by claim 6 wherein the opening is defined by opening edges in the sidewalls, the opening being upwardly open towards the removable lid.

8. An auxiliary hopper as defined by claim 7 wherein the removable screen has channel edges that engage the opening edges of the sidewalls.

9. An auxiliary hopper as defined by claim 8 wherein the removable screen is trapped in the opening by the removable lid engaging the auxiliary hopper.

10. An auxiliary hopper as defined by claim 9 wherein the removable screen is protected by an exterior wall that extends outward from the auxiliary hopper the exterior wall defining an open bottom.

11. A planting unit for a seeding machine, the planting unit comprising:

an auxiliary seed hopper having sidewalls defining an interior for receiving seed, the sidewalls are provided with an opening having a removable screen through which air can be vented;

a seed meter for receiving and metering seed from the auxiliary hopper; and a furrow opener for forming a planting furrow into which seed is deposited from the seed meter;

wherein the auxiliary hopper is provided with a inlet seed passage through which seed passes into the interior; and wherein the auxiliary hopper has an open top that is enclosed by a removable lid.

12. A planting unit as defined by claim 11 wherein the opening is defined by opening edges in the sidewalls, the opening being upwardly open towards the removable lid.

13. A planting unit as defined by claim 12 wherein the removable screen has channel edges that engage the opening edges of the sidewalls.

14. A planting unit as defined by claim 13 wherein the removable screen is trapped in the opening by the removable lid engaging the auxiliary hopper.

15. A planting unit as defined by claim 14 wherein the removable screen is protected by an exterior wall that extends outward from the auxiliary hopper, the exterior wall defining an open bottom.

* * * * *